Aug. 14, 1945.　　　　W. ERNST　　　　2,382,041
TURRET PRESS
Filed March 1, 1941　　　5 Sheets-Sheet 3
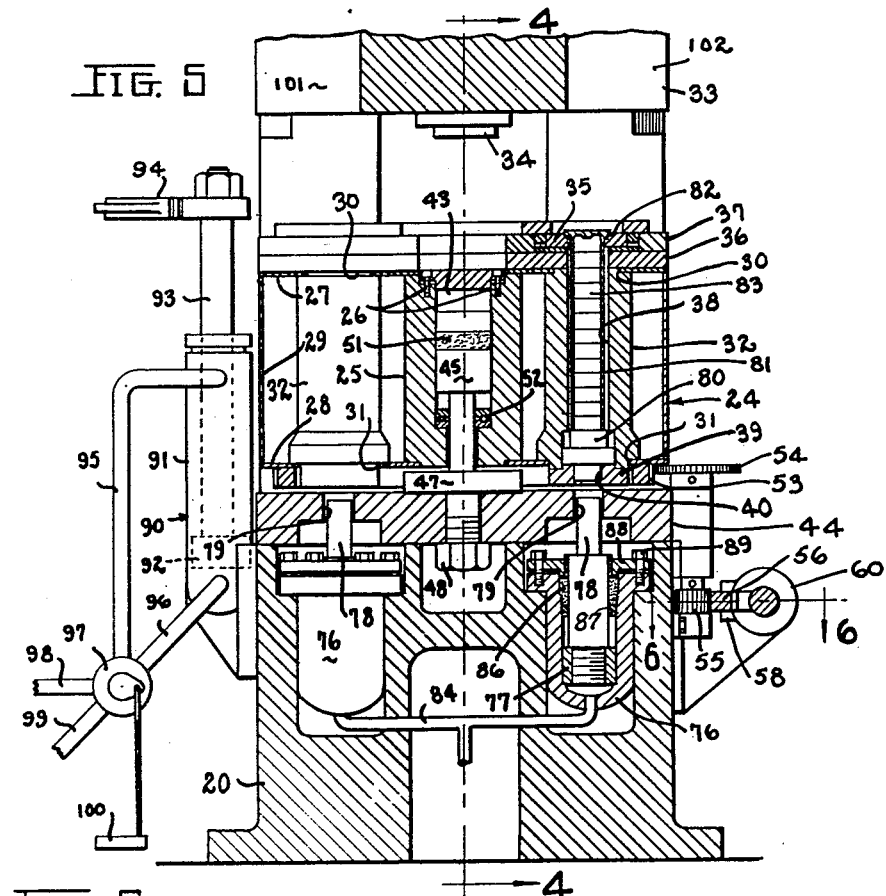
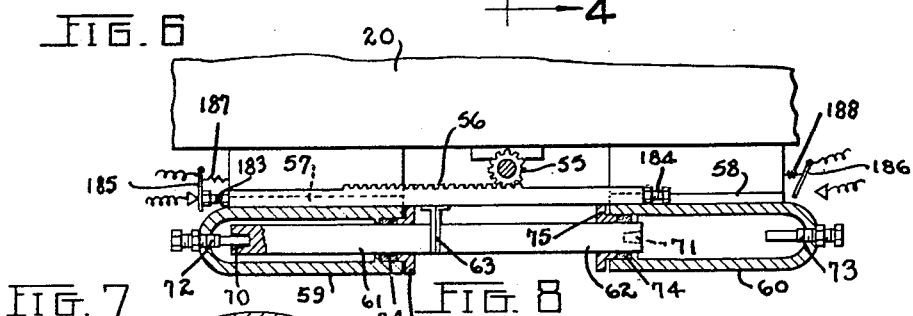
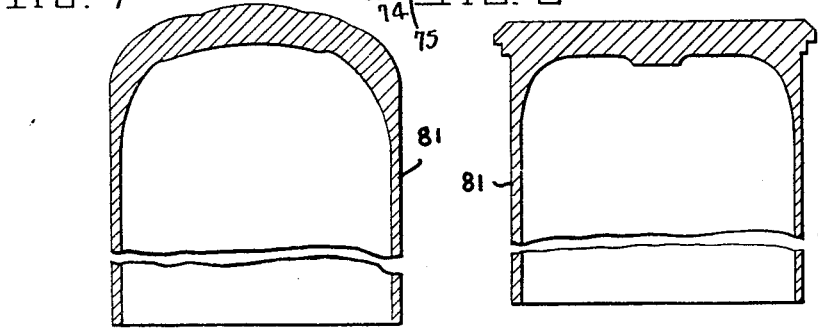
INVENTOR
WALTER ERNST
ATTORNEYS Aug. 14, 1945.       W. ERNST       2,382,041
TURRET PRESS
Filed March 1, 1941       5 Sheets-Sheet 4

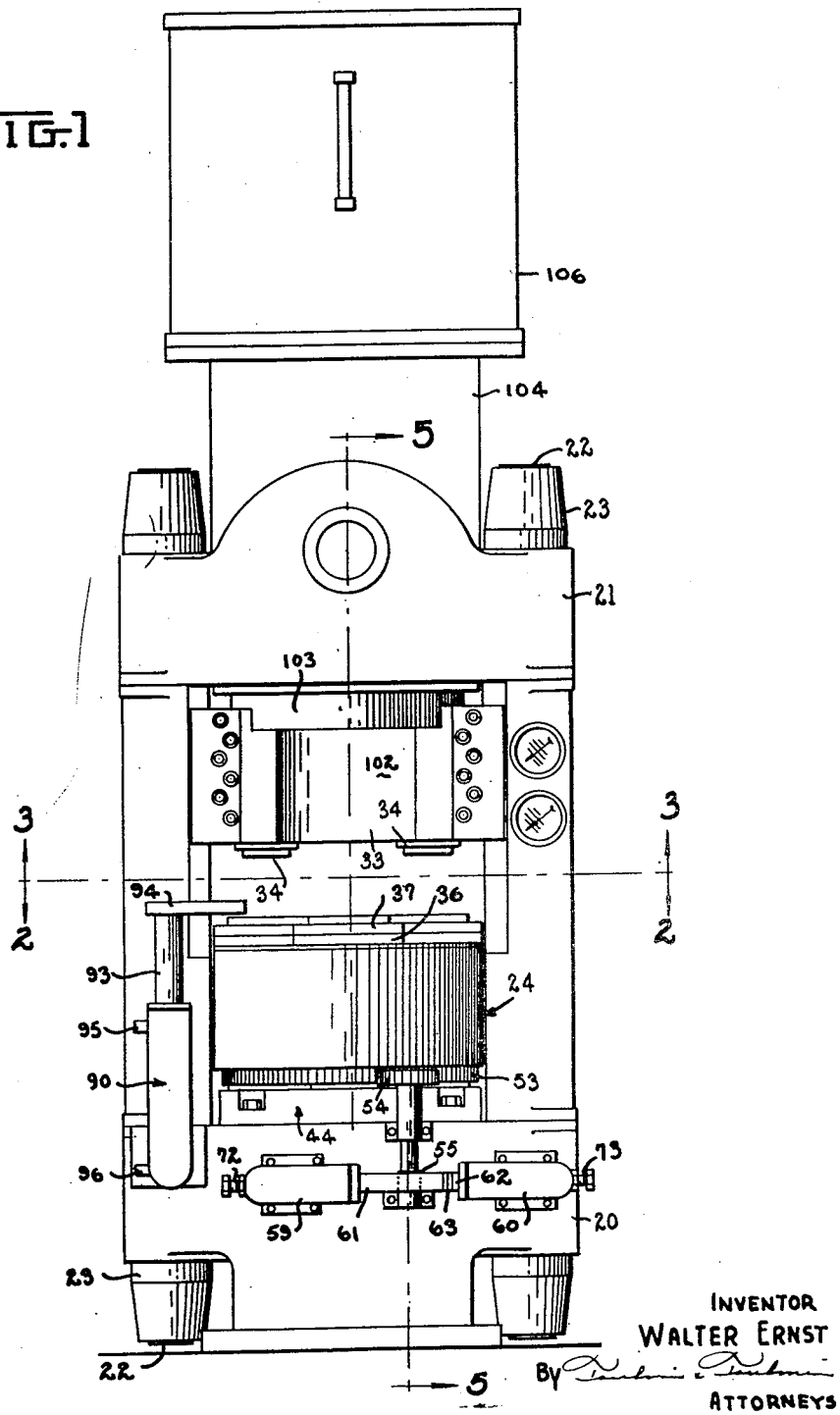

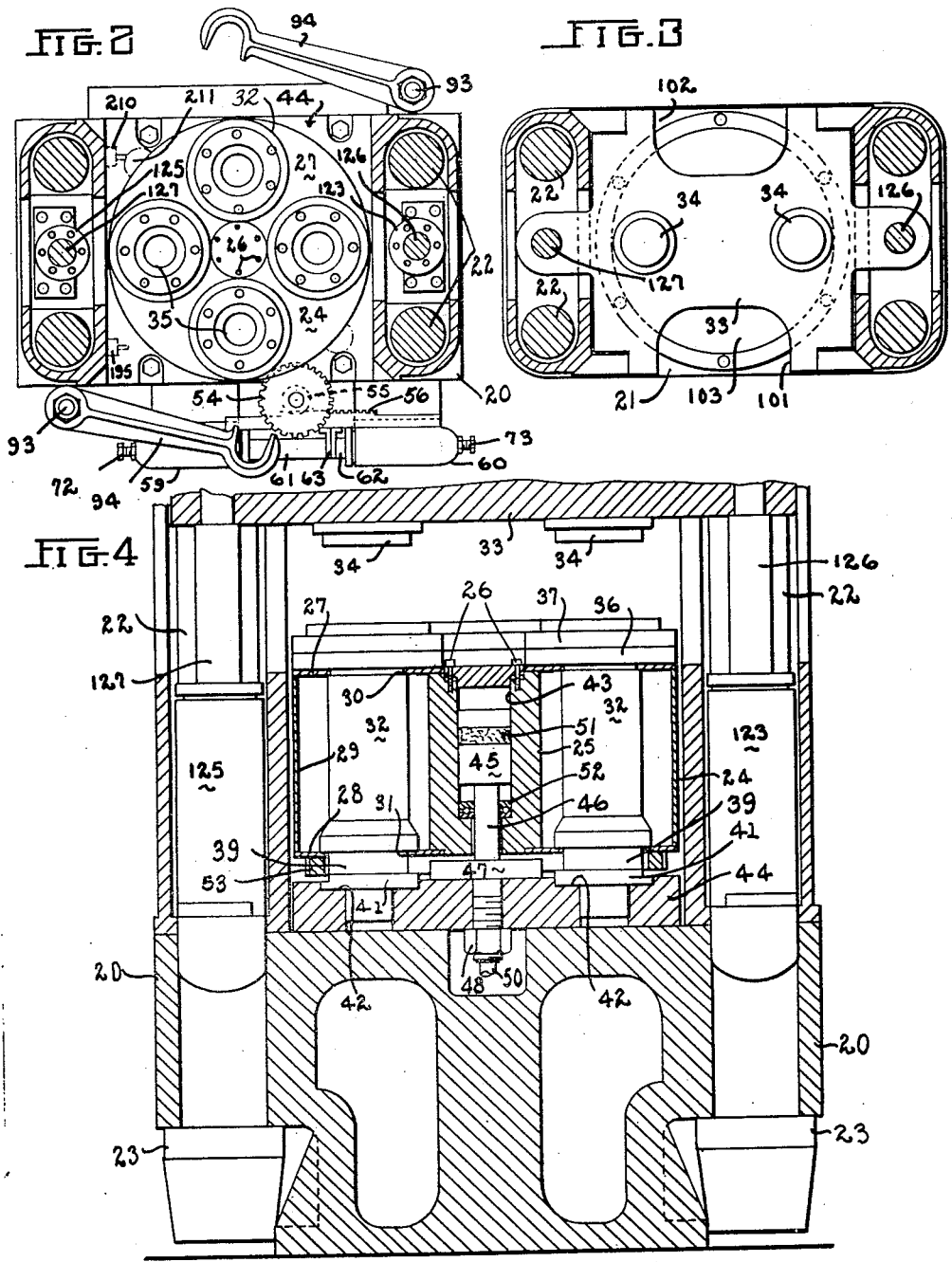

INVENTOR
WALTER ERNST
BY
ATTORNEYS

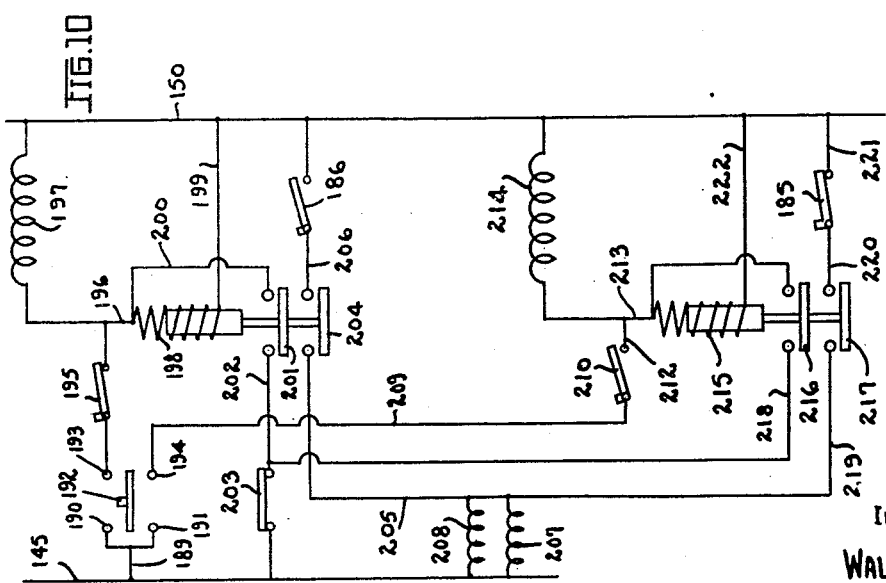

Patented Aug. 14, 1945

2,382,041

UNITED STATES PATENT OFFICE 2,382,041

TURRET PRESS

Walter Ernst, Mount Gilead, Ohio, assignor to The Hydraulic Development Corporation, Inc., Wilmington, Del., a corporation of Delaware Application March 1, 1941, Serial No. 381,376

12 Claims. (Cl. 78—42)

This invention relates to presses and press control systems, and in particular to turret presses having rotary turrets for feeding the work pieces to the press.

One object of this invention is to provide a turret press in which a rotatable turret may be angularly shifted by a predetermined but adjustable angle to allow the employment of various turrets with a different number of turret stations in connection with one and the same pressing plunger.

It is another object of this invention to provide a turret press in which hydraulic shifting means is provided, which is adapted both to shift the turret from one indexing position to another indexing position and to hold the turret in the thus shifted position for a predetermined time.

A further object of the invention consists in the provision of a turret press in which the turret is angularly reciprocated between two predetermined positions and is automatically held in its respective position until the pressing operation is completed.

Another object of the invention is to provide a turret press in which the initiation of a working stroke of the pressing plunger is controlled by the turret so that the pressing plunger can be operated only after the turret has been moved to a work indexing position.

Still another object is to provide a turret press in which the turret is hydraulically held in one and the same indexing position during two subsequent working strokes of the pressing plunger.

A still further object of the invention is to provide a turret press in which the turret shifting mechanism may be used in connection with differently sized turrets so as to allow of a variation of turrets being used in connection with one and the same press.

Another object of the invention consists in the provision of a turret press in which the turret, after completion of a working stroke, is shifted to a predetermined position in which a fluid operable extracting mechanism may extract the work piece from the turret.

These and other objects and advantages of the invention will appear more clearly from the following specification in connection with the accompanying drawings, in which:

Figure 1 illustrates a front view of an embodiment of the invention.

Figure 2 is a section along the line 2—2 of Figure 1 and shows a top view of the turret.

Figure 3 is a section along the line 3—3 of Figure 1 and shows two upper dies connected to the platen.

Figure 4 is a vertical section along the line 4— of Figure 5 and illustrates the lifting mechanism for the turret.

Figure 5 is a longitudinal section along the lin 5—5 of Figure 1.

Figure 6 illustrates the mechanism for angu larly shifting the turret.

Figure 7 is a diagrammatic cross section through a typical work piece ready for the pressing operation in the turret press according t the invention.

Figure 8 shows the work piece of Figure after the completion of the pressing operation

Figure 10 shows another electric circuit whic may be used in connection with the hydrauli circuit of Figure 9 for a simplified control of th press.

General arrangement

Figure 9:
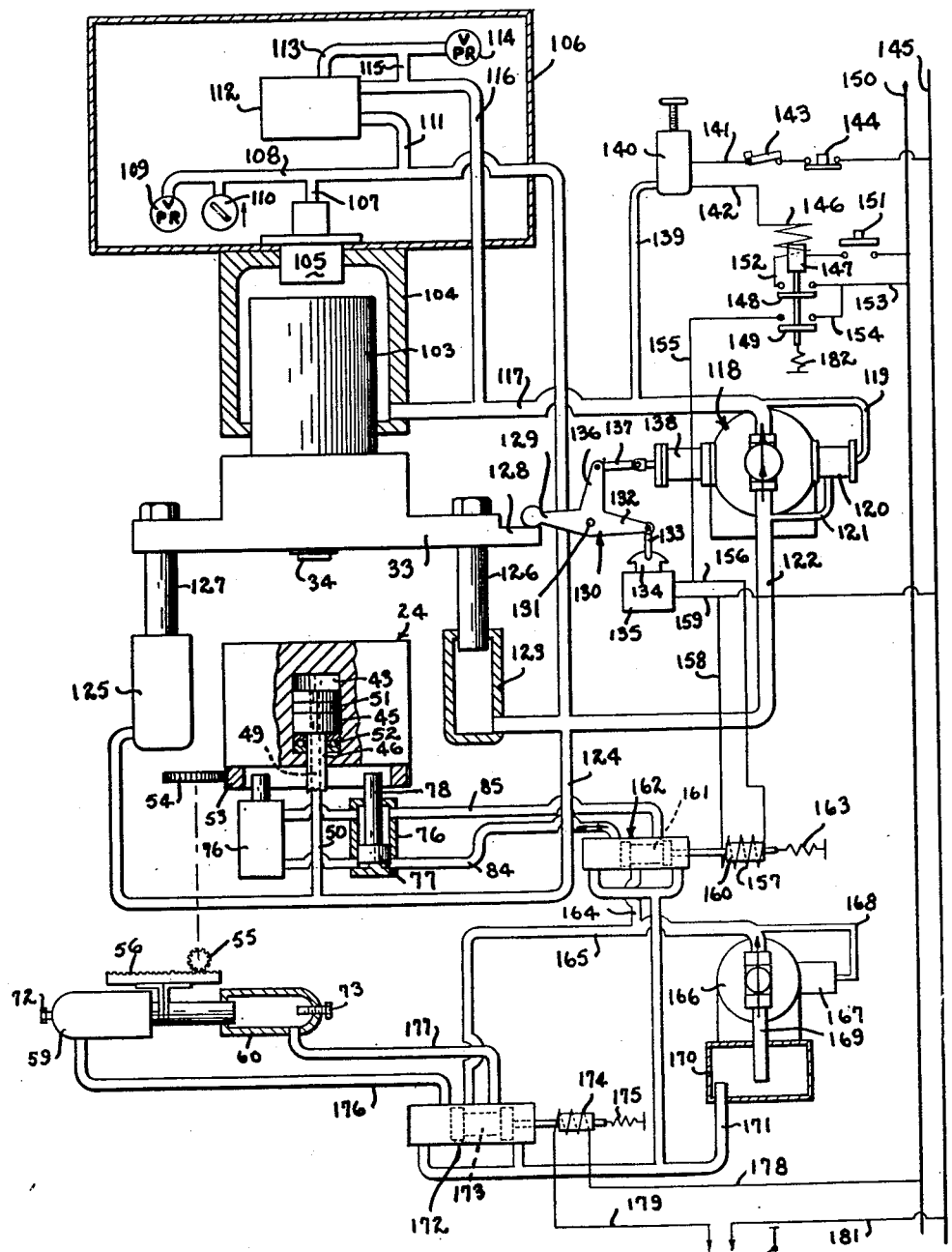
Figure 9 shows the complete hydraulic an electric circuit for the press of Figure 1.

In general, the turret press of the present in vention consists of a press frame having a be and a head interconnected by strain rods and rotatable turret between said strain rods. Th turret is normally supported upon the bed c the press during the pressing operations but i raised from the press bed and into engagemer with anti-friction bearings during its rotatin or indexing operation. After the indexing opera tion has been completed the turret is brougł again to rest upon the press bed, thereby re moving the load from the turret bearings s that the press bed and not the turret bearing sustains the thrust of the pressing platen durin the pressing operation.

The rotating or indexing operation of the tur ret is effected by a hydraulic motor which is als adapted to hold the turret in its indexing posi tion.

According to one embodiment of the inventior the operation of the hydraulic motor for rotatin the turret is initiated by a starter but ton, while the actual pressing operation is ini tiated by manually pressing a second starte button.

The pressing platen of the press, accordin to the invention, may be provided with one singl upper die carrier or a plurality of die carrier which become effective during one and the sam working cycle, so that during one cycle eithe a single pressing operation is performed or a plu rality of pressing operations.

The invention comprises a control system which, without effecting any changes in the structure of the press or in the control system, may selectively be operated so as to cause the pressing platen to perform two working strokes during one and the same indexing operation of the turret or, if desired, only one working stroke during the same indexing operation of the turret. This control system includes a four-way valve which, responsive to the movement of the platen, controls the supply of pressure fluid to a fluid motor actuating a die carrier with a plurality of dies.

The press according to the invention is furthermore so constructed as to allow the substitution of one turret for another turret while maintaining the shifting and lifting mechanism for the turret. The turret shifting mechanism is furthermore adapted to effect annular reciprocation of the turret by a predetermined but adjustable angle so that in case the turret comprises four stations it may be rotated by 90 degrees only, while in case the turret comprises two stations only it may be rotated by 180 degrees.

*Structural arrangement*

Referring first to Figure 1, the press illustrated therein comprises a press bed 20 and a press head 21 interconnected with each other by strain rods 22 and nuts 23. Normally supported by the press bed 20 is a turret 24 which comprises a central member 25 connected at its upper end, for instance by screws 26, with a top portion 27 and connected at its lower end with a bottom portion 28. The top and bottom portions 27 and 28 are interconnected with each other by side portions 29. The various portions of the turret may be connected together by welding or in any other convenient manner.

The top and bottom portions 27 and 28 comprise openings 30 and 31 respectively in which according to the embodiment of Figure 1 are mounted four turret stations 32 (Figure 2). Each of these turret stations is sufficiently strong to sustain the pressing force of the platen 33 which carries two upper die members 34 cooperating with corresponding lower die members 35. The lower dies are supported and held in position on the turret by plates 36 and ring members 37. The tubular turret stations 32 are provided with bores 38 closed at their lower ends by the head members 39 (Figure 5) having bores 40 for receiving the ejector mechanism subsequently described. The turret stations, when in pressing operation, rest upon supporting blocks 41 provided in correspondingly shaped recesses 42 in a bolster plate 44 which in its turn rests upon the bed 20. The bolster plate 44 is rigidly connected to the bed 20 in any convenient manner.

The central member 25 of the turret 24 comprises a cylinder 43 cooperating with a piston 45 therein which, by means of the piston rod 46 with its flange 47, is rigidly connected to the bolster plate 44 by means of the nut 48. The piston rod 46 has a bore 49 therein (Figure 9) which passes through the piston 45, thereby communicating with the upper portion of the cylinder 43. The bore 49 is connected to a conduit 50 which leads to the hydraulic system, which will be described later.

To prevent leakage from the upper portion of the cylinder 43 to the lower portion thereof, the piston 45 is provided with a sealing ring 51. Also provided in the cylinder 43 at the bottom portion thereof is an anti-friction bearing 52. This arrangement is such that when pressure fluid is introduced into the conduit 50, it passes through the piston rod 46 and piston 45 into the upper portion of the cylinder 43, thereby lifting the turret until the piston 45 abuts the anti-friction bearing 52, whereupon the lifting operation of the turret stops.

The turret 24 also carries an annular gear ring 53 meshing with a pinion 54 which is drivingly connected with a pinion 55 (Figures 5 and 9) which in its turn meshes with a rack 56. The gear ring 53 has such a height that it remains in mesh with the pinion 54 also when the turret is in lifted position. The rack 56 is guided in guiding members 57, 58 respectively connected to the cylinders 59, 60.

Reciprocably mounted in the turret shifting cylinders 59, 60, are plungers 61, 62, which may be integral with each other or consist of two portions rigidly connected with each other. Movably connected with the plungers 61, 62 is a supporting member 63 which is rigidly connected to the rack 56 so that movement of the plungers 61, 62 effects movement of the rack 56.

The cylinders 59, 60 are adapted to be supplied with fluid pressure for selectively moving the plungers 61, 62 in one or the other direction. Each of the plungers 61, 62 has at its free end a tapered recess 70, 71, adapted to cooperate with adjustable bolts 72, 73 which, when the plungers 61, 62 approach the end of their extreme right hand and left-hand position respectively, enter the said recesses, thereby causing a cushioning effect. The adjustable bolts 72, 73 are also adapted to limit the stroke of the plungers 61, 62.

To prevent leakage from the cylinders 59, 60 their inner ends are closed by packing material 74 compressed by glands 75.

As will be clear from the above, movement of the plungers 61, 62 in one or the other direction will actuate the pinion 55 which in its turn will convey its movement by means of the pinion 54 to the gear ring 53 so as to rotate the latter and thereby also the turret by a predetermined angle which is variable in accordance with the adjustment of the adjustable bolts 72, 73 and, thereby of the stroke of the rack 56.

Also mounted in the press bed 20 are two ejector cylinders 76 which are oppositely arranged and are adapted to register with two turret stations after they have moved from their working position by a predetermined angle, in the particular instance in the embodiments of Figures 1 and 2 by 90 degrees. In other words, according to the embodiments of Figures 1 and 2, the plane through the axes of the ejector cylinders forms an angle of 90 degrees with the plane interconnecting the axes of the upper dies 34.

Reciprocably mounted in the ejector cylinder 76 is a plunger 77 with an ejector rod 78 adapted to pass through a bore 79 in the bolster plate 44 and to engage a work piece supporting member 80 in the turret stations 32. The supporting member 80 supports the work piece 81 and an inner die, generally designated 82, preferably made up of a plurality of individual blocks 83 so that the height of the inner die may be easily varied. The lower portion of the ejector cylinders 76 communicates with a conduit 84 (Figures 5 and 9), while the upper portion of the ejector cylinders communicates with a conduit 85.

To prevent leakage from the ejector cylinder 76, packing material 86 is provided adjacent the upper end of each ejector cylinder and is compressed between a ring member 87 threadedly connected to the cylinders 76 and a closure member 88 connected to the respective cylinders 76 by means of screws 89. The ejector rod 78 is adapted partially to lift the finished work piece out of the respective turret station, whereupon it may be fully extracted from the said turret station by means of a fluid operable lifting device 90. This lifting device consists, according to the showing in Figures 1 and 5 of a fluid cylinder 91 having reciprocably mounted therein a double-acting piston 92 connected with a piston rod 93 which at its upper end carries a hook-shaped gripping member 94. The gripping member 94 is shiftable about the piston rod 93 so that it can easily be swung into engagement with a finished work piece for lifting the same out of its respective turret station and after the lifting operation thereof has been completed can then be shifted by a desired angle to unload the work piece, for instance on a conveyor or the like.

The upper and lower portions of the cylinder 91 communicate respectively with a conduit 95 and 96 leading to a four-way valve 97, which communicates with a fluid source by means of conduit 98 and with an exhaust by means of conduit 99. The valve 97 may be operated in any convenient manner, for instance by actuating a foot pedal. To facilitate the lifting operation, the press platen 33 comprises recesses 101 and 102 which register with the turret stations in their ejecting position.

The platen 33 is connected to a ram 103 reciprocably mounted in the press cylinder 104 which is provided with a surge valve 105 adapted selectively to admit fluid from a fluid tank 106 into the cylinder 104 or vice versa. The surge valve 105 does not form a part of the present invention and for a more detailed description thereof reference may be had to U. S. Patent No. 2,193,248 to Ernst. The surge valve 105 serves to prefill the cylinder 104 when the ram 103 moves downwardly by gravity. Hydraulically connected with the surge valve 105 is a conduit 107 communicating with a conduit 108 which comprises a pressure relief valve 109 and a check valve 110 adapted to allow fluid to pass from the fluid tank 106 into the conduit 108 but not vice versa. Branching off from the conduit 108 is a conduit 111 leading to the main cylinder release and pump by-pass valve 112. This valve which serves to facilitate the initiation of a retraction stroke by releasing the pressure in the cylinder 104 does not form a part of the invention and may be of the type described in U. S. patent application 286,063 to Ernst, filed July 24, 1939, which has matured into Patent No. 2,268,205. Also communicating with the valve 112 is a conduit 113 comprising a pressure relief valve 114 and communicating with a conduit 115 leading to a conduit 116, one end of which communicates with the main cylinder release and pump by-pass valve 112, while the other end of conduit 116 leads to a conduit 117. The conduit 117 communicates on one hand with the cylinder 104 and on the other hand with one side of a reversible variable delivery pump 118.

Branching off from the conduit 117 is a pilot line 119 leading to a servomotor 120 for the variable delivery pump 118. Also communicating with said servomotor is a pilot line 121 leading to a conduit 122 which is connected with the other side of the variable delivery pump 118. The servomotor 120 is adapted, in response to a predetermined pressure in the lines 117 or 122, to shift the pump to substantially no-delivery position. The conduit 122 leads to a push-back cylinder 123 and communicates with the conduit 108 and a conduit 124 leading to a push-back cylinder 125. Reciprocably mounted in the push-back cylinders 123 and 125 are push-back plungers 126 and 127 connected with the platen 33 for effecting the retraction stroke of said platen and the ram 103. The platen 33 has an arm 128 cooperating with the free arm 129 of a three arm lever, generally designated 130 and shiftable about the pivot 131.

The lever 130 is operatively connected by means of its arm 132 and the link 133 with the armature 134 of a solenoid 135, while the arm 136 of the lever 130 is connected by a link system 137 with the flow control member of the variable delivery pump 118 in a manner well known to those skilled in the art so that energization of the solenoid 135 moves the pump 118 to full delivery forward stroke position while, when the solenoid 135 is de-energized, a spring in the servomotor 138 connected with the pump 118 urges the pump to full delivery retraction stroke position. Servomotors of the type referred to above for controlling the pump 118 are well known in the art and may be of the type disclosed in U. S. Patent No. 2,184,665 to Ernst.

Branching off from the conduit 117 is furthermore a conduit 139 leading to a tonnage control valve 140 which, responsive to a predetermined pressure in the conduit 139, opens a switch, the terminals of which are connected with lines 141 and 142 respectively. As soon as the pressure which has caused the opening of said switch in the tonnage control valve decreases, the said switch automatically closes again. Tonnage control valves of this type are well known in the art and are described, for instance, in the U. S. Patent No. 2,224,957 to Ernst.

The line 141 comprises normally closed switches 143 and 144 and leads to the main supply line 145. The switch 143 is an over travel safety switch and is adapted to be engaged by the platen 33 so as to be opened thereby in case due to an accident, for instance cracking of the work piece, the necessary pressure for operation of the tonnage control valve 140 should not develop and the platen should move beyond a desired point.

The line 142 communicates with a contactor coil 146, the energization of which controls the movement of the armature 147 with the blades 148 and 149. The contactor coil 146 is adapted to be connected with the main supply line 150 by closure of the starter switch 151. Also connected with the coil 146 is a line 152 which, by closure of the blade 148, may be connected with the line 153 leading to the main supply line 150. Closure of the blade 149 effects communication between the line 154 connected to the line 153 and the line 155 connected to the line 156. The line 156 connects one end of the solenoid 135 with one end of the solenoid 157, while the other end of the solenoid 157 is connected by lines 158 and 159 with the other end of the solenoid 135.

Energization of the solenoid 157 controls the movement of an armature 160 which is connected with a double piston valve member 161 of a four-way valve, generally designated 162. The arrangement is such that energization of the solenoid 157 moves the valve member 161 toward the left with regard to Figure 9, while when the solenoid 157 is de-energized, a spring 163 moves the valve member 161 toward the right. The four-way valve 162 communicates with the conduits 84 and 85 and furthermore communicates with a conduit 164 leading to a conduit 165 which is connected to the pressure side of an auxiliary variable delivery pump 166. This pump has a servomotor 167 similar to the servomotor 120 which is connected by means of a pilot line 168 with the line 164 so that the pump, in response to a predetermined pressure in the line 165, moves substantially to no-delivery position. The suction side of the auxiliary pump 166 is connected by means of a conduit 169 to a fluid tank 170.

Leading from the fluid tank 170 is a conduit 171 connected to a four-way valve 172 which is also connected with the conduit 165. The four-way valve 172 is similar to the four-way valve 162 and has a double piston valve member 173 which is moved by energization of the solenoid 174 in one direction and urged by spring 175 in the opposite direction.

Also communicating with the four-way valve 172 are conduits 176 and 177 respectively leading to the turret shifting cylinders 59 and 60. One end of the solenoid 174 communicates by means of the line 178 with the main supply line 150, while the other end of the solenoid 174 communicates with a line 179 adapted by closure of switch blade 180 to be connected with the line 181 leading to the main supply line 145.

Operation

It may be assumed that all parts of the press occupy the position shown in Figure 9 and that it is now desired to perform a pressing cycle. To this end, two operators, working on different sides of the press, insert the inner dies 82 and work pieces 81 into the turret stations 32 which register with recesses 101, 102 in the press platen 33. Thereupon the switch blade 180 is actuated so as to effect interconnection of the lines 179 and 181. As a result thereof, current flows from the main supply line 145 through lines 181, 179, solenoid 174 and line 178 to the main supply line 150, thereby energizing the solenoid 174 and shifting the valve member 173 toward the left.

Assuming that previously the auxiliary pump 166 has been started, fluid pressure will flow from the pump 166 through lines 165 and 176 into the turret shifting cylinder 59, while the turret shifting cylinder 60 will be connected through line 177 with the exhaust line 171. As a result, the fluid pressure acting in the cylinder 59 moves the plungers 61 and 62 toward the right and, thereby, also the rack 56, which movement, by means of pinions 55 and 54, is conveyed to the gear ring 53 connected to the turret 24 so as to rotate the turret which, at the end of its last stroke, was moved into its lifted position. When the bolt 73 engages the bottom of the recess 71 in the plunger 62, the rack 56, and thereby also the turret 24, comes to a stop.

The turret 24 has now been shifted by 90 degrees so that the just loaded turret stations now register with the upper dies 34 on the platen 33, while the turret stations previously in alignment with the upper dies 34 and containing completed work pieces have now been moved into position where they register with the ejector rods 78.

Due to the fact that the pump 166 holds its pressure in line 165, the rack 56 is positively held in its shifted end position, thereby also holding the turret in its last shifted position.

To initiate the pressing operation, the normally open starter switch 151 is now closed so that current flows from the main supply line 145 through the normally closed switches 144, 143, line 141, tonnage control valve 140, contactor coil 146 and switch 151 to the main supply line 150. As a result thereof, the coil 146 is energized and causes the blades 148 and 149 to move to closing position. The blade 148 establishes a holding circuit for the coil 146, which holding circuit comprises main supply line 145, switch 144, 143, line 141, tonnage control valve 140, line 142, coil 146, line 152, blade 148 and lines 153 and 150.

The blade 149 closes the circuit comprising the lines 150, 153, 154, blade 149, line 155, solenoid 135, lines 159 and 145. Simultaneously by way of lines 156 and 158 it also closes a circuit through the solenoid 157 which is arranged in parallel to the solenoid 135. Energization of the solenoid 135 actuates the lever 130 and by means of the link system 137 puts the pump 118 into full delivery forward stroke position.

Energization of the solenoid 157 causes the valve 161 to move toward the left so that pressure fluid from the pump 166 flows through conduits 165, 164, valve 162, conduit 84, into the lower portion of the ejector cylinders 76, thereby moving the ejector rods 78 upwardly and partially lifting the completed work pieces out of their respective turret stations. The operators may then shift the gripper arms 94 beneath the head of the completely finished and now partially extracted work pieces, and by operation of the valve 97, for instance, by stepping upon the pedal 100, cause fluid pressure to enter beneath the piston 92 for moving the grippers 94 upwardly to fully extract the work pieces. The completed work pieces may then, by shifting of the grippers 94, be unloaded, for instance, on a conveyor.

After unloading the completed work pieces, new work pieces may be gripped by the grippers 94 and moved into alignment with the respective turret stations, whereupon, by operation of the valve 97, fluid pressure may be introduced above the piston 92 so as to lower the grippers 94 and thereby the work pieces into the empty turret stations. The grippers 94 are then moved out of alignment with the just loaded turret stations.

While this loading and unloading is being performed, the ram 103 moves downwardly by gravity and fluid is delivered by the pump 118 into the cylinder 104, which is supplemented by fluid passing from the tank 106 through the surge valve 105. Fluid from the push-back cylinders 123 and 125 escapes through the line 124 to the line 122, which is now the suction line of the pump 118, while any excess fluid may escape through the conduit 108 and the pressure reducing valve 109.

As soon as the upper dies 34 engage the work pieces 81, pressure builds up in the cylinder 104 so that the surge valve 105 closes. While the ram 103 now further advances, the engagement of the upper dies with the work pieces carried by the turret causes the turret to move from its lifted position downwardly until the turret stations 32 rest upon the supporting blocks 41, in which position the antifriction bearings 52 are relieved of any load of the turret while the load of the turret is now taken up completely by the bolster plate 44 and press bed 20. The fluid expelled from the upper portion of the cylinder 43 escapes through the bore 49 and conduit 50 into the conduit 124 from where it may flow to conduit 122, which is now the suction side of the pump 118.

When at the end of the actual pressing stroke a predetermined pressure has built up in the cylinder 104, it actuates the tonnage control valve 140 so as to interrupt the electric connection between the lines 141 and 142. This breaks the holding circuit for the coil 146 so that the spring 182 now opens the switch blades 148 and 149. This also breaks the energizing circuit for the solenoid 135 and the solenoid 157.

De-energization of the solenoid 135 causes a spring in the servomotor 138 of the pump 118 to move the latter to full delivery retraction stroke position so that pressure fluid is delivered by pump 118 into the line 122 and thereby into the push-back cylinders 123 and into the upper portion of the turret cylinder 43. Consequently, while the platen 33 is now moved upwardly, also the turret 24 is lifted.

De-energization of the solenoid 157 causes the spring 163 to shift the valve member 161 so that pressure fluid from the pump 166 flows through conduit 164 into the conduit 85 and from there into the upper portion of the ejector cylinders 76, thereby causing the ejector rods 78 to move downwardly. When the platen 33 has reached the end of its upward stroke, it actuates the lever 130 so as to shift the pump 118 to substantially no-delivery position. If desired, the lever 130 may be omitted and the platen 33 be made to be halted at the end of the retraction stroke by a stop, in which case the pump, in response to a predetermined fluid pressure in the conduit 122, would be moved to substantially no-delivery position by fluid pressure conveyed from the conduit 122 through the pilot line 121 to the servomotor 120.

All parts of the press now occupy the position shown in Figure 9 with the exception that the switch 180 is in closed position and that the plungers 61 and 62 are in their right-hand position. The press is then ready for a new cycle, which may be initiated by opening of the switch 180 so that the spring 175 moves the valve member 173 to a position in which fluid pressure passes through the conduit 177, thereby shifting the rack 56 toward the left so as to rotate the turret 24 into a position in which the just completed work pieces register with the ejectors, while the work pieces loaded during the last pressing stroke are moved into pressing position.

*Alternative electric circuit*

While in the arrangement of Figure 9 two switches, namely 180 and 151, are subsequently to be actuated for performing a complete cycle comprising the indexing operation and the pressing operation, it may happen that the proper order of actuating the switches 180 and 151 is accidentally reversed so that the ram starts its downward movement while the turret has not been shifted so that the previously completed work pieces are still in their pressing position. While no harm would be done to the work pieces as long as they remain in their pressing position, there would still be a valuable loss of time until the ram has been returned to its initial position. However, if the error should have been noticed and it would be tried, during the downward stroke of the ram to shift the turret, the work pieces completed during the last pressing operation may be damaged.

In order to avoid accidental reverse of the proper sequence of operation of the switch 180 and the switch 151, the electric circuit shown in connection with Figure 9 may be replaced by the circuit of Figure 10, while the turret shifting cylinders 59, 60, may be supplemented by switches as shown in Figure 6. Referring to Figure 6, it will be noted that each end of the rack 56 carries an adjustable abutment screw 183, 184 adapted respectively to close electric switches, generally designated 185, 186. The switches are norm held in open position by means of springs 187, respectively.

It is of course understood that, if desired, e of the adjustable abutment screws 183, 184 constitute a contact of the switches 185, 186 spectively, in which case the springs 187, 188 be omitted. The switches 185, 186 form a p of the electric control circuit of Figure 10. Figure 10 the main supply lines are again de: nated with the numerals 145 and 150.

Connected with the main supply line 145 line 189 are two terminals 190 and 191 adar selectively and respectively to be connected the starter switch blade 192 with the termii 193, 194. The starter switch blade 192 is r mally held in its intermediate position, for stance by springs (not shown). The termi 193 is connected by a normally closed con switch 195 with a line 196.

The line 196 leads to one end of the soler 197, which latter takes the place of the soler 174 in Figure 9 and is adapted, when energi: to shift the valve member 173 of the four-v valve 172 to the right. The other end of solenoid 197 is connected with the main sup line 150. The line 196 is also connected w one end of the solenoid 198 which correspond: the contactor coil 146 of Figure 9. The other end of the solenoid 198 is connected by means line 199 to the main supply line 150. Furth more connected with the line 196 is a line adapted, in response to the energization of solenoid 198, to be connected by the norm: open switch blade 201 with the line 202 comp: ing the normally closed tonnage control swi 203. The line 202 is connected with the m supply line 145. Energization of the solenoid also causes the normally open switch blade to close, thereby interconnecting the line 205 w the line 206.

The line 206 connected to the main supply l 150 comprises the normally open switch 186 wh is adapted to be closed by rightward movem of the rack 56 (Figure 6). Connected to the l 205 is one end of a solenoid 207, the other end which is connected to the main supply line 1 The solenoid 207 fully corresponds to the sc noid 157 controlling, in cooperation with spring 163, the movement of the valve 162 whi in its turn, controls the operation of the ejecto Also connected with the conduit 205 is one end the pump solenoid 208, the other end of wh is connected with the main supply line 143. T solenoid 208 fully corresponds to the solenoid of the embodiment of Figure 9.

The terminal 194 which, as mentioned above adapted to be connected by the starter swi blade 192 with the terminal 191, is connected line 209 with the normally closed control swi 210, which is shown in the drawings in open 1 sition, into which it is moved by a cam 211 the turret 24 (Figure 2) when the turret l reached one indexing position. When the tur leaves this indexing position, the control swi 210 closes, while the cam 211 opens the norma closed control switch 195 when the turret 1 reached its other indexing position.

In closed position the control switch 210 cc nects the line 209 with the line 212 which lea to the line 213. The line 213 is connected w one end of a valve shifting solenoid 214 whi when energized, takes the place of the spri 175 in the embodiment of Figure 9. The oth end of the solenoid 214 is connected with t main supply line 150. The line 213 is furthermore connected with one end of a solenoid 215 controlling the operation of switch blades 216 and 217 so that energization of the solenoid 215 causes the switch blade 216 to connect line 213 with the line 218 connected to the line 202.

Energization of the solenoid 215 also causes the blade 217 to connect the line 219 with the line 220. The line 219 is connected with the line 205, while the line 220 is adapted to be connected with the line 221, leading to the main supply line 150, when the switch 185 (Figure 6) is in closed position, as shown in Figure 10.

*Operation of alternative electric circuit*

Supposing that the mechanical and hydraulic parts of the structure in Figure 9 occupy the position shown therein, and that the electric circuit of Figure 9 has been replaced by the electric circuit of Figure 10, the device operates as follows:

To start a cycle, the starter switch blade 192 is actuated to momentarily effect connection between the terminals 190 and 193. Current will then flow from the main supply line 145 through line 189, starter switch blade 192, control switch 195, line 196, and from there, on one hand through solenoid 197 and the main supply line 150, and on the other hand through solenoid 198 and line 199 likewise to the main supply line 150. As a result thereof, the solenoids 197 and 198 are energized.

Energization of the solenoid 197, which, as previously mentioned, takes the place of the solenoid 174 of Figure 9, shifts the valve 173 so that fluid pressure from the auxiliary pump 166 passes through the conduit 176 into the shifting cylinder 59, where it moves the plungers 61, 62 and, thereby, the rack 56 toward the right. This movement is conveyed through the pinions 55 and 54 to the gear ring 53 so as to effect an indexing operation of the turret as previously described in connection with Figure 9.

Energization of the solenoid 198 causes the blade 201 to interconnect the conduits 200 and 202, thereby establishing a holding circuit for the solenoids 197 and 198. Energization of the solenoid 198 furthermore causes the blade 204 to interconnect the line 206 and the line 205. However, no circuit is closed thereby, since the switch 186 is held open by the spring 188. In the left end position of the rack 56 the switch 185 was closed by the screw 183 against the thrust of the spring 187, while in the corresponding position of the turret 24 the cam 211 held the control blade 210 open. When now, due to the energization of the solenoid 197, the rack 56 moves away from its left end position, thereby also causing the turret 24 to leave its last indexing position, the spring 187 opens the switch 185, while the control switch 210 closes. In other words, while the rack 56 is intermediate its two end positions, both control switches 195 and 210 are closed, while the switches 185 and 186 are open. Closure of the control switch 210 is without effect at this time of the cycle and so is the opening of the switch 185.

When the rack 56 has reached its right end position, it closes the switch 186, while the turret has moved to its new indexing position, in which the cam 211 has opened the control switch 195. Since, as mentioned before, the solenoids 197 and 198 are held energized through blade 201, the opening of the control switch 195 has no effect on the solenoids 197 and 198 and, therefore, has no effect on the position of the valve member 173 and of the rack 56, which latter is consequently held in its new position due to the pressure fluid in the line 176. Closure of the switch 186, however, establishes a circuit through the pump solenoid 208 and the solenoid 207 which controls the valve 162. This circuit comprises the line 150, now closed switch 186, line 206, blade 204 and line 205, from where the current flows, on one hand, through pump solenoid 208 and, on the other hand, through the valve solenoid 207 to the main supply line 145.

Energization of the pump solenoid 208 causes actuation of the lever 130 which shifts the main pump 118 to full delivery forward stroke position. The ram 103 then starts its downward stroke as described above in connection with the operation of the electric circuit shown in Figure 9. Energization of the valve solenoid 207 causes the valve member 161 to move so that fluid pressure from the auxiliary pump 166 passes below the ejector plungers 77 so as to lift the ejector rods 78 and cause the same partially to lift the previously completed work pieces from the respective turret stations. The completed work pieces may then be removed and replaced by new work pieces as likewise described above in connection with the structure of Figure 9.

As soon as, at the end of the pressing stroke, a predetermined pressure is obtained in the press cylinder 104, this pressure is conveyed through the conduits 117 and 139 to the tonnage control valve 140, thereby opening the tonnage control switch 203. This breaks the holding circuit for the solenoids 197 and 198 so that the same are de-energized and the blades 201 and 204 open. Opening of the blade 204 breaks the energizing circuit for the valve solenoid 207 and the pump solenoid 208. De-energization of the valve solenoid 207 allows the spring 163 to return the valve member 161 to a position in which pressure fluid from the auxiliary pump 166 passes through the line 185 into the upper portion of the ejector cylinders 76, thereby returning the ejector plungers 77 to their lowermost position.

De-energization of the pump solenoid 208 allows the spring (not shown) in the servo-motor 138 of the main pump 118 to shift said main pump to full delivery retraction stroke position, so that pressure fluid from the pump 118 now flows into the push-back cylinders 123 for retracting the platen 33, while a part of the pressure fluid flows through conduits 124 and 50 and the bore 49 into the upper portion of the turret cylinder 43, thereby lifting the latter. The platen 33 now returns to its initial position in the manner previously described. The press ram 103, the turret 24 and the ejectors are then in the position shown in Figure 9.

To start a new cycle, the operator presses the starter switch blade 192 so as to interconnect the terminals 191 and 194. Current will then flow from the conduit 145 through line 189, blade 192, line 209, the now closed control switch 210, line 212 and, on one hand, through valve solenoid 214 to the main supply line 150 and, on the other hand, to solenoid 215 likewise to the main supply line 150.

Energization of the valve solenoid 214 which, as previously mentioned, takes the place of the spring 175 in Figure 9, shifts the valve member 173 so that pressure fluid from the auxiliary pump 166 flows into the line 177, thereby moving the plungers 61 and 62 and the rack 56 toward the left. This movement is conveyed through pinions 55 and 54 in the previously mentioned manner to the turret 24, which then moves from its present to its previous indexing position. As soon as the turret 24 leaves its present indexing position, the control switch blade 195 closes again. When the turret has reached its new indexing position, the cam 211 opens the control switch 210 which, however, has no effect on the circuit.

Energization of the solenoid 215 causes blade 216 to interconnect the lines 218 and 213, thereby establishing a holding circuit for the solenoid 215, which holding circuit comprises the line 145, tonnage control switch 203, line 218, blade 216, line 213, solenoid 215, line 222 and the main supply line 150. Energization of the solenoid 215 also causes the blade 217 to interconnect the lines 219 and 220.

Since in the pressing cycle the switch 185 was open, closure of the blade 217 does not establish a circuit. However, as soon as the rack 56 has again reached its left end position while the turret 24 has reached its corresponding indexing position, the rack 56 has closed the switch 185, thereby establishing a circuit comprising the main supply line 145, pump solenoid 208, line 219, blade 217, line 220, switch 185, line 221 and main supply line 150.

Energization of the pump solenoid 208 puts the pump on full delivery forward stroke in the manner previously described so that the ram 103 now starts its pressing stroke. The operation then follows the same lines as described above. In other words, at the end of the pressing operation the tonnage control switch 203 opens, thereby breaking the holding circuit for the solenoid 215 so that the switch blades 216 and 217 move to open position. Opening of the switch blade 217 causes de-energization of the pump solenoid 208 and de-energization of the valve solenoid 207.

De-energization of the pump solenoid 208 allows the spring in the servomotor 138 of the pump 118 to move the pump to full delivery retraction stroke position, while de-energization of the solenoid 207 allows the spring 163 to shift the valve member 161 so as to cause pressure fluid to flow through the line 85 into the ejector cylinders 76 for moving the ejector plungers 77 to their lowermost position. The ram 103 now completes its retraction stroke at the end of which the pump 118 is moved to substantially neutral position as described above. The ram 103, the turret 24, the ejectors and the valve plungers 61 and 62 now again occupy the position shown in Figure 9.

Assuming now that instead of starting the last mentioned cycle by interconnecting the terminals 191 and 194, the blade 192 was by mistake actuated so as to interconnect the terminals 190 and 193, this would establish no circuit in contrast to the electrical circuit of Figure 9 so that the press would not move at all. The operator would then at once know that he has made a wrong contact and without causing any dead stroke or damage he can immediately actuate the starter switch blade 192 to make the proper contact.

It will be understood that the present invention is not limited to the specific embodiment shown in the drawings but embraces also such modifications as come within the scope of the claims.

Having thus fully described my invention, what I claim as new and desire to secure by Letters Patent is:

1. In combination in a press, a frame, a work-holding turret mounted in said frame, a movable press ram, fluid pressure responsive means for rotatably supporting said turret, said turret being normally supported on said frame, anti-friction bearing means for limiting motion of said turret out of engagement with said frame whereby to selectively support said turret by said fluid pressure responsive means for indexing operations or on said frame for pressing operations, said pressure-responsive means being operable in response to a predetermined pressure on said ram for causing said turret to come into engagement with said frame.

2. In combination in a press, a frame, a work-holding turret mounted in said frame, a movable press ram, fluid pressure means for rotatably supporting and raising said turret, whereby said turret is supported by fluid under pressure in its raised position for indexing operations, and supported on said frame in its lowered position for pressing operations, and means operable in response to a predetermined pressure on said ram for causing the lowering of said turret.

3. In combination in a press, a frame, a work-holding turret mounted in said frame, a movable press ram, fluid pressure responsive means for rotatably supporting said turret, said turret being normally supported by said frame, means for selectively bringing said turret out of engagement with said frame whereby to selectively support said turret by fluid under pressure for indexing operations and means operable in response to a predetermined pressure on said ram for causing said turret to come into engagement with said frame, and a hydraulic motor means for indexing said turret while said turret is supported on said fluid under pressure.

4. In combination in a press, a frame, a work-holding turret mounted in said frame, a movable press ram, fluid pressure operated means for raising and rotatably supporting said turret, whereby said turret is supported by fluid under pressure in its raised position for indexing operations, and supported on said frame in its lowered position for pressing operations, said fluid pressure operated means being operable in response to a predetermined pressure on said ram for causing the lowering of said turret onto said frame, and hydraulic motor means connected to index said turret by a predetermined adjustable angle.

5. In combination in a press, a frame, a work-holding turret mounted in said frame, a movable press ram, anti-friction bearings, fluid pressure means for raising said turret against said bearings whereby said turret is supported by fluid under pressure in its raised position for an indexing operation, and supported on said frame in its lowered position for a pressing operation, said fluid pressure means being operable in response to a predetermined pressure on said ram to lower said turret, and hydraulic motor means for indexing said turret, said motor means including piston means and adjustable means for limiting the travel of said piston means.

6. In combination a press, a frame, a work-holding turret mounted in said frame, a movable press plunger, means for introducing a body of fluid under pressure between said frame and said turret for directly rotatably supporting said turret, said means operating to raise said turret whereby said turret is supported on said body in its raised position for indexing operations, and supported on said frame in its lowered position for pressing operations, said turret being lowered in response to a predetermined pressure by said plunger for causing the lowering of said turret and hydraulic motor means for indexing said turret, said motor means including piston means and adjustable means for limiting the travel of said piston means in both directions of movement of said piston means.

7. In combination with a press, a frame, a work holding turret rotatably mounted on said frame, a cylinder part, a piston part reciprocable within said cylinder part on an axis of rotation of said turret, one of said parts being attached to said turret, the other of said parts being attached to said frame, whereby, when fluid pressure is introduced into said cylinder, the parts are reciprocated to float said turret directly by fluid pressure.

8. In a press, a support, a work holding turret normally resting on said support during a pressing operation, and fluid pressure means for raising said turret from said support and directly floatingly supporting the same on fluid under pressure for indexing movement thereof.

9. In a press, a support, a work holding turret normally resting on said support during a pressing operation, fluid pressure means for raising said turret from said support and directly floatingly supporting the same on fluid under pressure for indexing movement thereof, and stop means comprising an anti-friction bearing limiting the raising movement of said turret.

10. In a press, a support, a work holding turret normally resting on said support during a pressing operation, fluid pressure means for raising said turret from said support and directly floatingly supporting the same on fluid under pressure for indexing movement thereof, and pressure fluid actuated means connected to said turret to impart indexing movement thereto.

11. In a press, a frame, a ram, a work holding turret movable to a plurality of predetermined indexing positions to present a workpiece therein to said ram for pressing, said turret resting on said frame during pressing of the workpiece, and means for introducing a body of fluid under pressure between said turret and frame to raise said turret from said frame and movably support the same directly upon said body during indexing movement.

12. In a press, a frame, a work holding turret mounted on said frame for axial movement and rotational indexing movement, means for introducing a body of fluid under pressure between said turret and frame for moving said turret axially and thereby directly supporting said turret on said body, and fluid pressure responsive means for rotating said turret while so supported and holding the same in indexed position.

WALTER ERNST.